United States Patent [19]

Sparks et al.

[11] Patent Number: 5,453,133
[45] Date of Patent: Sep. 26, 1995

[54] SOIL REMEDIATION

[75] Inventors: Bryan D. Sparks, Gloucester; F. Weldon Meadus, Ottawa; David H. McNabb, Vegreville; C. Edward Capes, Ottawa, all of Canada

[73] Assignee: National Research Council of Canada, Ottawa, Canada

[21] Appl. No.: 73,514

[22] Filed: Jun. 9, 1993

[30] Foreign Application Priority Data

Jun. 9, 1992 [GB] United Kingdom ............... 9212145

[51] Int. Cl.$^6$ ............................ B08B 3/04; B08B 7/00
[52] U.S. Cl. ................... 134/25.1; 134/10; 134/26; 134/40; 134/42; 208/390; 208/391
[58] Field of Search .................. 134/10, 25.1, 26, 134/40, 42; 208/390, 391

[56] References Cited

U.S. PATENT DOCUMENTS 4,719,008  1/1988  Sparks et al. ............... 208/390

*Primary Examiner*—Richard O. Dean
*Assistant Examiner*—Zeinab El-Arini

[57] ABSTRACT

The invention disclosed relates to a process for removing contaminants, such as hydrocarbons, from soil. The process involves contacting the contaminated soil with a suitable solvent for the contaminant, in the presence of a bridging liquid which is immiscible with the solvent, while agitating. The amount of the bridging liquid and the degree of agitation are balanced to control the particle size of the substantially contaminant- and solvent-free soil agglomerates so formed.

19 Claims, 6 Drawing Sheets

SOIL REMEDIATION

BACKGROUND OF THE INVENTION

1. Field of the Invention

This Invention relates to a method for soil remediation, and in particular to a process for removing hydrocarbon contaminants from soil, and providing a matrix suited for brine and heavy metal leaching.

Most countries have oil-contaminated soils as a result of petrochemical spills or industrial development. Oil-contaminated soil may affect human and animal health, air and water quality and the production of agronomic, range and forest crops. Furthermore, soil clean-up is often a prerequisite to the development of contaminated sites for other uses.

Spills of crude oil and petroleum products from the vast network of collection, processing, transportation and marketing facilities in North America pose a major risk to the environment. Tens of thousands of kilometers of pipelines and thousands of hectares of well-sites and facilities are needed to collect and process crude oil. Although reported losses of liquid hydrocarbons from these facilities average less than 0.01 percent of production, spills in Alberta, Canada have exceeded $5 \times 10^3$ m$^3$ annually in the 1980's (Energy Resources Conservation Board, 1991, Environment Information System, unpublished document, Calgary, Alberta). Gasoline, fuel oil and jet fuel represent 90 percent of the hazardous materials (3.6 billion tons) transported in the United States annually and account for 25 percent of the reported spills[1]. The United States Environmental Protection Agency estimates that 35 percent, or 840,000, of underground fuel storage tanks are leaking[2]. Also, another 100,000 to 400,000 tanks, used to store other liquid petroleum and chemical substances, may be or have been leaking. 2. Description of the Prior Art Technologies to clean-up petrochemical spills are expensive and all have numerous limitations with respect to costs, efficacy for treating specific petrochemicals and properties of the contaminated soil. Some treatments, such as landfarming and landfilling, are being reduced or abandoned because of environmental concerns. New technologies are being developed but with the possible exception of thermal desorption, which is inappropriate for removal of low volatile organics, all methods are poorly suited for removing petrochemicals from fine textured soils. In these soils the content of particles having diameters less than 0.1 mm is great enough to alter the engineering properties of the soil.

Fine texture is a property of the majority of soils on the earth's surface which are capable of supporting vascular plants. Most of these soils have 20 percent, or more, of their particles in the less than 0.5 mm diameter size range[3]. With the exception of solid phase bioremediation, technologies to treat contaminated fine textured soils generally require that the treated soil be landfilled because alternative treatments impair soil quality, reduce or prevent the growth of plants and increase the likelihood of erosion.

Examples of existing technologies for treating petroleum contaminated soil include: incineration (retorting), thermal desorption, soil washing, bioremediation.

Incineration: This method is very effective for removing organic contaminants but the humic material, necessary for maintenance of topsoil's essential characteristics, is destroyed. Also, the mineralogical properties of the soil are altered, adversely affecting its geotechnical properties. Such treated soil is only suitable for landfill.

Thermal desorption: Suitable for removal of volatile hydrocarbons such as: gasoline, diesel fuel etc. Method is not appropriate for heavy oils, bitumens or asphaltic materials. However, the natural humic matter may be affected, by oxidation, even at low operating temperatures.

Soil Washing: This technique is mostly used for coarse soils and involves scrubbing contaminated soil with water or surfactant solutions. Any fines in the soil are dispersed in the aqueous phase to form a middlings fraction that is difficult to separate and treat.

Bioremediation: Cleaning by this method is slow and requires maintenance of proper drainage, aeration and fertilization of the contaminated soil over long periods of time. Also, soil organisms are not very effective for the treatment of some organic compounds. This treatment may leave the soil in an undesirable hydrophobic condition.

Solvent extraction: This approach can effectively remove contaminants by extraction with a solvent. However, soil fines presents a solids-liquid separation problem.

The National Research Council of Canada has also previously developed a Solvent Extraction/Spherical Agglomeration (SESA) process, described, for example, in U.S. Pat. No. 4,719,008 of 12 Jan. 1988, the Disclosure of which is Incorporated by Reference herein. This process has been used for the extraction of bitumen from oil/tar sands.

SUMMARY OF THE INVENTION

Applicants propose to use a combination of solvent extraction and solids agglomeration to separate the bulk of the hydrocarbon contaminant, by dissolution into an appropriate solvent, and production of an agglomerated clean soil requiring minimal additional treatment in order to retain soil productivity. A solvent is selected that has good solvency towards the contaminant but which has minimum impact on the natural organic matter in the soil. During processing the natural soil aggregates are broken down to ensure good extraction of the contaminant. The soil is reformed by a process of liquid phase agglomeration, using water to bind the extracted soil solids together into aggregate-like agglomerates of nearly clean soil. Agglomerates of medium to fine textured soil are stronger than the natural aggregates found in comparable native soil; also, their size distribution is such that a bed of aggregates will drain rapidly. These properties not only allow for the recovery of any associated, residual solvent, by low temperature drying, but also for subsequent removal, e.g. by leaching, of other contaminants which are insoluble in the extracting solvent, such as brine residues or heavy metals. If necessary a final bioremediation step can be carried out on site to reduce further any contaminate residues remaining after solvent extraction. If it is determined that a bioremediation step will be necessary, soil amendments to promote bioremediation can be added during the initial treatment phase.

According to the invention, a method for removing contaminants from soil is provided, comprising (a) contacting contaminated soil with a suitable solvent for the contaminant, in the presence of an aqueous bridging liquid immiscible with said solvent in an amount commensurate with the moisture content in the soil being in the capillary range, while agitating to form soil agglomerates substantially free of contaminants and solvent, wherein the amount of bridging liquid and the degree of agitation are balanced to control the particle size of the soil agglomerates to have substantially the same size distribution as natural soil aggregates, and (b) separating the substantially contaminant- and solvent-free soil agglomerates.

DESCRIPTION OF THE PREFERRED EMBODIMENT(S)

Figure 1:
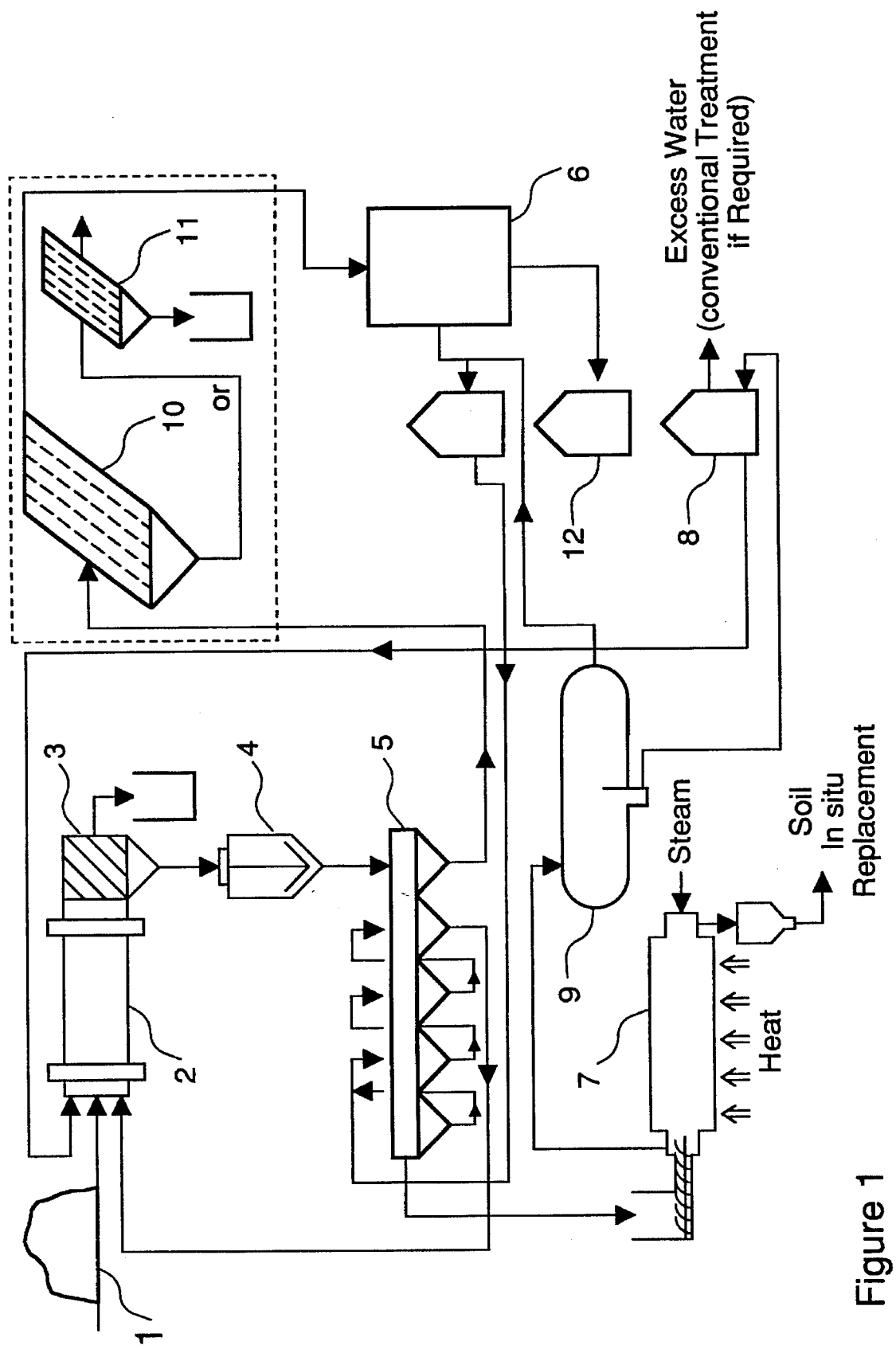
FIG. 1 is a schematic flow diagram for a Solvent Extraction Soil Remediation (SESR) plant suitable for soil remediation.

Applicants have discovered that their SESA process may be modified and applied to the removal of hydrocarbon contaminants from soil. The use of this now called-SESR process also permits bioremediation of the processed soil. This integrated process offers the opportunity to clean various contaminated soils and return the remediated soil to the original landscape. The SESR process does not remove the fines from contaminated soil but agglomerates them with the coarser material to form the basis for a reconstructed soil. If the contaminant recovered from the soil is a crude oil or fuel, it may be sold to an oil-recycling facility to off-set remediation costs. Consequently, the products of this integrated technology are potentially useable and the process does not produce any major waste streams which cannot be recycled.

Theory

Liquid phase agglomeration (LPA) is a size enlargement technique that can be used as an aid to improve the separation of fine solids from either aqueous or organic based suspensions or slurries. A second liquid must be selected that will preferentially wet, or adsorb on, the surfaces of the particulate solids while being virtually immiscible with the slurry suspending medium. Addition of a minor amount of this second, or bridging, liquid to the solids slurry, in conjunction with suitable agitation, will result in attachment of primary particles to form aggregates. The strength of the bonding between particles results from the capillary forces arising after interaction between adsorbed layers of second liquid during particle collisions in the agitated slurry or suspension. The form and size of agglomerates produced are primarily dependent on the amount of second liquid added and the degree of agitation applied. Appropriate mixing can be achieved using rotating drums, stirred tanks or shakers of different types. Table 1 illustrates the type of agglomerates formed with different amounts of second liquid.

TABLE I

COMPARISON OF AGGREGATE TYPE AND CHARACTERISTICS

| | Low Second (Bridging) Liquid Content | High Second (Bridging) Liquid Content |
|---|---|---|
| Agglomerate Type | Floc | Aggregate |
| Average Size | <1 mm | >1 mm |
| State of Bridging Liquid | Pendular to funicular | Funicular to Capillary |
| Bridging Liquid Content | 0.5–10 w/w % | 10–35 ww % |
| Suspending Liquid Separation | Difficult | Easy |
| Separation Technique | | |
| Gravity drainage | Fair | Good |
| Vacuum Filtration | Good | Excellent |
| Entrapment of Non-wetted Solids | Can be trapped in Floc structure | Pore saturation tends to exclude both non-wetted solids and suspending medium. |

It will be noted from Table I that lower levels of second liquid result in the formation of a flocculated product; in this case interparticle adhesion occurs through pendular liquid bridges. There is insufficient second liquid present to completely coat the particle surfaces, resulting in a limited number of possible particle interactions. Consequently, the agglomerates formed have an open structure which tends to retain large amounts of the suspending medium. As the amount of added second liquid is increased the adsorbed bridging liquid forms a continuous layer around all particles; it is now said to be in the funicular state. There is now no limit to the number of possible particle combinations and the flocculated structure will condense to form more compact aggregates. The effect of capillary forces and agitation tends to give these aggregates a spherical form. Although the bridging liquid now forms a continuous network throughout each aggregate there is still insufficient present to fill completely the internal pores; retention of suspending medium in the pore spaces is therefore relatively high. If enough bridging liquid (i.e. 10 to 35% w/w, or up to the plastic limit of the soil) is present to fill the internal porosity of the agglomerates then the system enters the capillary state. Under these conditions the suspending medium is virtually eliminated from the internal pore volume and the aggregates reach a maximum in density and strength.

Agglomerate size normally increases with the amount of bridging liquid added. However, an increase in degree of agitation will have an opposing effect, with smaller, more dense agglomerates being formed. The final equilibrium agglomerate size can therefore be controlled by balancing these two process variables. Other factors affecting the final result are the particle size distribution and the amount of fine solids, especially clays (particles<2 μm), present in the material being treated, in particular, aggregate strength, in both the wet and dry states, is dependent on these factors.

More specifically, the suspending phase is selected to be a good solvent for the oily contaminant, provided only that the criterion of immiscibility with a suitable bridging liquid is met.

If the soil particles are hydrophillic in nature then water alone can be used as the bridging liquid for aggregation of the soil particles. Where a soil has dried out and the oil has had an opportunity to contact and bind to the particle surfaces, then surface modifying agents can be added to the bridging liquid in order to displace the surface contamination and produce a water-wettable condition; agglomeration can then proceed in the normal fashion. Such additives included alkali metal pyrophosphates, orthophosphates and oxalates, alkali metal hydroxides, alkali metal silicates and surfactants of the surface wetting variety, particularly petroleum sulphonate. The optimum soil pH range for growing most plants is about 6 to 7. However, it will be appreciated that some plants may do better outside this range.

Soil amendments can also be introduced into the aggregates.

A number of solvent extraction methods have been described for soil remediation[4]. In general these processes work well with coarse soils but have difficulty in handling fines because of the problems encountered with solid-liquid separation of the latter solids from the solvent. With the SESR process these separation problems are overcome by forming aggregates, of controlled size, tailored to suit a particular separation method or application; for soil remediation a particle size range of 0.5–2 mm diameter provides optimal aeration and drainage for a subsequent bioremediation polishing step.

One disadvantage of the agglomeration process is that both solvent and contaminant can become entrapped inside the agglomerates as they form. This problem can be at least partially resolved by ensuring that the agglomerates are continually broken down and reformed during the solvent-soil contacting stage. Thus, trapped contaminant is re-exposed to the solvent thereby increasing the overall degree of extraction. Solvent entrapment can be minimised by maintaining the bridging liquid content in the capillary region. However, in this state, agglomerate growth is sensitive to the bridging liquid content, and equilibrium aggregate size will increase rapidly with the amount of water added. Under these conditions, size control in the desired range can be achieved by controlling the degree of agitation. For commercial operation of the process, rotating drums as described below are most appropriate.

In this case the introduction of a charge of steel rods and operation at low rpm allows satisfactory size control.

If the original water content of the soil falls outside the upper limit of the capillary range the moisture level must be reduced, either by drying or admixing it with other soil, or soil-like material, such as peat moss and fine agricultural limestone of lower moisture content. A feed-back circuit, including a dryer, may be provided to re-cycle dried feed-back soil to the reactor, to maintain the required moisture content.

PROCESS DESCRIPTION

As seen in FIG. 1 the contaminated soil is first excavated and piled as shown at 1.

If necessary, some delumping and drying can be carried out at this stage. The feed is then conveyed into the rotating contactor/agglomerator 2. This cylindrical vessel is similar in design to a conventional rod mill used for grinding. It is lined with polyurethane and contains a relatively small charge of steel rods (10 to 15% of internal volume). Normally, the drum is rotated at 10–20% of the critical speed compared to about 80% for a conventional mill. A trommel screen 3 is attached to the drum exit to separate unbroken lumps or rocks from the treated feed; this reject material can be recycled back to the mill or treated separately to recover any associated solvent. The extracting solvent and water are also added to the mill. Solvent extraction of the contaminant and agglomeration of the solids occur concurrently. The tumbling charge of rods serves to break down lumps of soil and also to control agglomerate size. Conveniently, the solvent used is a conventional, mid-range, petroleum derived naphtha, however, it may be necessary to modify its composition, by, for instance, fortifying the aromatic content to suit the requirements of a particular contaminant. The solvent entering the contactor is a recycle stream from another part of the process and already contains some dissolved contaminant.

When hydrocarbon contaminants are involved, suitable solvents may be selected from organic solvents such as naphtha; aromatic solvents of the class of toluene and xylene; halogenated solvents of the class of methylene chloride, trichlorotriflouroethane and trichloroethylene; cyclic aliphatic compounds of the class of cyclohexane; straight-chain aliphatic compounds such as heptane; and mixtures thereof. Trichloroethylene is preferred.

When the contaminants include heavy metals, suitable solvents which are miscible with the organic solvent are included, such as acetyl acetonate, lauric acid, 8-hydroxy quinoline, D1-2-ethylhexyl phosphoric acid oxime, 2-hydroxy-5-nonyl benzophenone oxime and di-nonyl naphthalene sulfonic acid. The highly branched aliphatic primary amines with desirable physical properties, such as solubility in hydrocarbons and almost complete immiscibility with water, have also been used with considerable success for the extraction of metals. The presence of a second fatty acid chain in the amine molecule lowers the solubility of the secondary amines in polar solvents markedly, while solubility in non-polar ones is increased, and is higher than that of primary amines. The tertiary amines with straight fatty chains are virtually water insoluble, the solubility being about 5 ppm for amines with more than eight carbon atoms per chain.

More specifically, the following reagents have been used along with organic solvents i.e. naphtha, toluene and xylene, to extract non-ferrous metals (Cu, Cr, Ni and Zn) from metal finishing industry wastes: di-2-ethylhexyl phosphoric acid (DI2EHPA), 2-hydroxy-5-nonyl benzophenone oxime (HSLIX), various oximes (LIX), dinonyl naphthalene sulfonic acid (SYNEX), and bis-(2,4,4-trimethylpentyl) phosphoric acid (CYANEX).

Methanol may be used as a co-solvent to assist in the displacement of contaminant from the soil surfaces.

The extraction/agglomeration is preferably effected in a temperature range of 25° to 50° C. The higher temperature will improve the rate of extraction, by about three times.

The retention time for the extraction/agglomeration is in the range of 2 to 10 minutes, with 3 to 6 minutes being sufficient for most applications. It will be appreciated that the retention time will depend on the temperature used i.e. a temperature of 50° C. requires less time than a lower temperature.

Vessel 4 acts as a reservoir to smooth out any flow fluctuations between the extraction and solid-liquid separation steps. Unit 5 is a solid-liquid separating means, in this case a rotating, horizontal pan filter. It can be set up for multiple countercurrent wash steps and be used for either gravity or vacuum assisted drainage. Feed to the filter is drained on the first segment to separate the bulk of the contaminant rich solvent. This fraction is pumped to unit 6 for solvent recovery. The segment then rotates through a number of steps while being washed with progressively cleaner solvent. Drainage from the first wash is recycled back to the extraction-agglomeration unit 2. The final wash is with clean solvent and is followed by a second drain step. At this point the extracted soil is in the form of solvent wet aggregates, in which the internal porosity is filled with water plus a small amount of entrapped contaminant solution.

The clean, solvent wet aggregates are discharged from the filter to the hopper of a rotary, externally heated dryer, with an atmosphere of steam flowing counter-currently to the tumbling charge, unit 7. The steam provides an inert atmosphere and also acts to suppress evaporation of water from the agglomerates during solvent recovery. Action to reduce water evaporation is desirable because of the high energy penalty involved in its volatilisation. The solvent present on the surfaces of the aggregates, representing the bulk of that present, is readily recovered. Solvent trapped in the internal aggregate porosity presents more of a challenge. However, the intimate mixture of water and solvent in the pores produces a steam distillation effect when the material is heated[5]. Such mixtures normally boil at a temperature lower than that of either component. However, liquids present in fine pores exhibit elevated boiling points owing to the necessity of overcoming the capillary forces resulting from surface tension. As a consequence of this effect a temperature of about 130° C. is needed to evaporate the water/solvent mixture entrapped in the soil aggregates within a reasonable time. The output from the dryer is a damp, aggregated solid, with low residual solvent and contaminant content, suitable for inoculation with microorganisms for final on-site bioremediation. For a petroleum contaminant, the residues remaining with the aggregates will be of two types: undissolved contaminant, probably enriched in asphaltic material, and a smaller amount of the whole contaminant remaining behind after removal of the solvent entrapped in the aggregate pores[6]. If the original contamination included brine and/or heavy metals the aggregates have suitable strength and particle size distribution for pile leaching to remove these components.

Water recovered during drying is separated in vessel 9, and can be recycled to the process untreated, unless there is a build-up of organic components as a result of steam distillation in the dryer. If this is the case the water will be treated by conventional means 8, e.g., carbon adsorption, prior to recycle. Depending on the water content of the original soil and the amount of water recovered in the drying step there may be a small excess of water produced for discharge from the process.

Solvent from the contaminant solution may be recovered for recycle e.g., by distillation or by using a membrane separation unit 6. If the contaminant solution contains dispersed, oil-wet solids these may be removed by centrifugation or settling in inclined plate settlers, units 10 or 11, prior to solvent recovery. This clean-up step will not always be necessary and will only be employed if the contaminant is a petroleum product suitable for recycle at a conventional oil refinery, where there may be a strict specification on the solids content of feedstock. Alternatively, the contaminant concentrate 12, along with any associated solids, may be disposed of by incineration.

In order for top soil to be returned to its original fertility after oil removal it is essential that the natural humic material be unchanged by the clean-up process. The naturally intractable nature of humic matter means that it is largely unaffected by the type of solvents used for extraction of petroleum contaminants in the SESA process.

Also, the drying step, employed for solvent recovery, utilizes a temperature of 100° to 200° C., preferably 130° to 150° C., i.e. low enough to avoid adverse effects on the humic material when compared to conventional thermal desorption and combustion processes. The latter are not capable of discriminating between different types of organic matter during treatment[7] and the cleaned soil from these processes is only suitable for landfill.

Bioremediation

After removal of the bulk of the oily contaminant by use of the SESA process bioremediation can be used to complete the cleaning process. In fact, biological action will be enhanced by adding amendments to the soil during agglomeration. The advantage of this approach is that the amendments will be uniformly distributed throughout the soil matrix. Amendments must either be water soluble or dispersible and should not bond with either solvent or contaminant. Suitable materials include most fertilizers, particularly, nitrogen, and carbohydrates to serve as feedstock for accelerating the growth of microbial organisms. Lime (CaO), gypsum, peat moss and non-decomposed organic matter can also be added. However, the organic materials will tend to decrease agglomerate stability.

If the soil has been contaminated with brine it must be leached to remove the associated salts before it will be capable of supporting most vascular plants[8]. Salt removal may be accomplished by pile leaching or by leaching on site. Pile leaching will produce a brine leachate which may need secondary treatment; on site leaching of high salt soils is commonly accomplished in dryer climates by irrigation while in more humid climates the same effect can be achieved through natural precipitation. The addition of calcium and ammonium salts or weak acids will accelerate leaching under all conditions, even of heavy metals. However, weak acids must be used with caution as they may reduce the stability of the agglomerates with concomitant, adverse effects on permeability, aeration and bioremediation.

Leaching of SESR processed soil will only be necessary if the original spill contained brine as well as crude oil. Soil contaminated only by hydrocarbons can be returned to the site immediately following treatment. Although the natural humic matter in the soil is unaffected by the treatment, inoculation of the agglomerates is necessary because the desolventizing process is expected to sterilize the soil. Bacterial inoculants can be used with agglomerated subsoil where biodegradation of the small amount of hydrocarbon remaining in the agglomerates is desired. Inoculation of surface soil is best accomplished using a non-contaminated soil as the inoculant. Agglomerated soil can be inoculated by mixing it with as little as one percent of native soil[9].

Integrated Process

Figure 2:
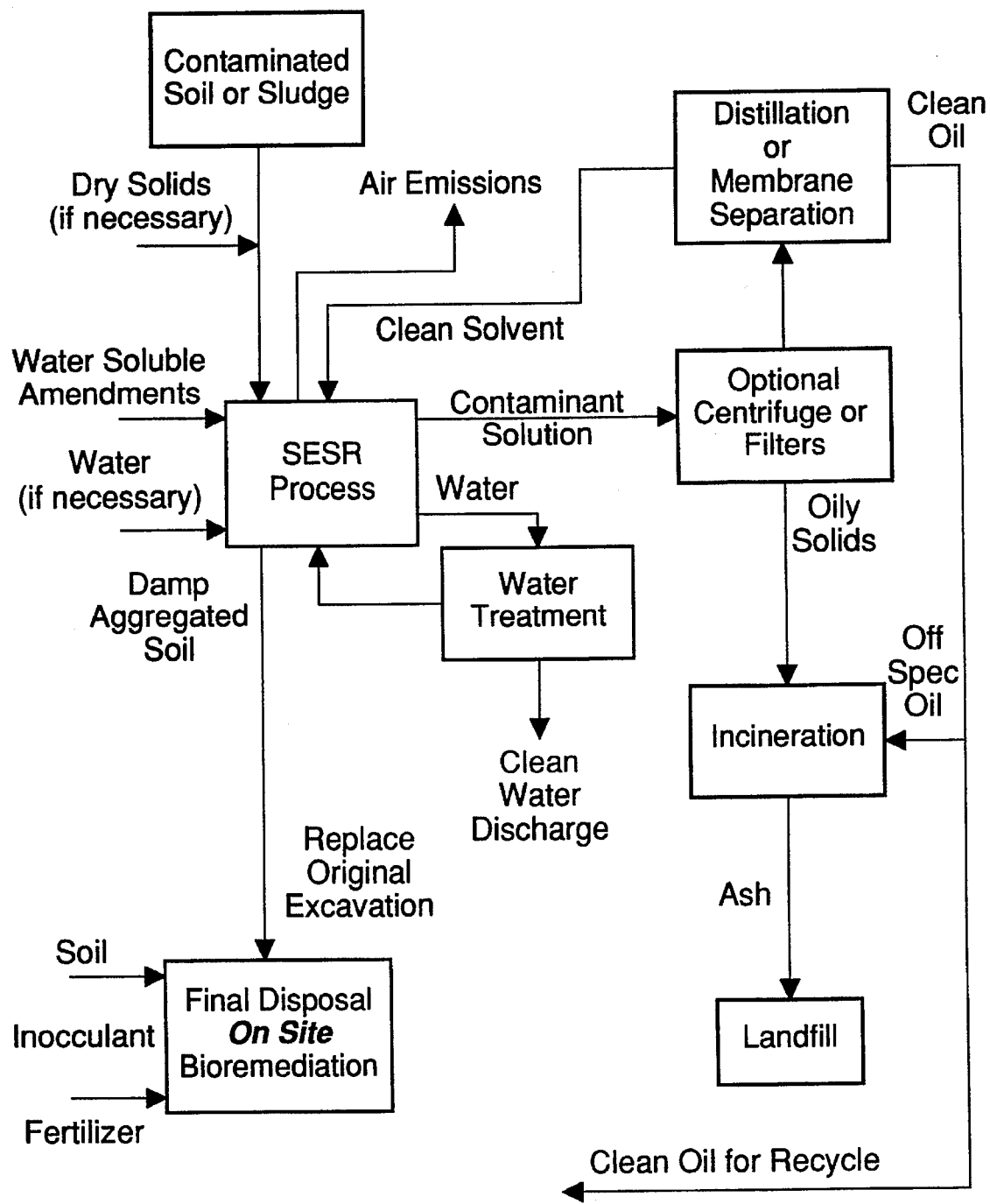
FIG. 2 is a schematic flow diagram of an integrated SESR/on site- bioremediation and leaching system.

A conceptual diagram, integrating the SESR process with on site, solid state bioremediation, including treatment of all, actual or potential, secondary streams, is shown on FIG. 2. The SESR process is water limited in that agglomeration can only be accomplished within a certain range of water content, therefore it may be necessary to partially dry the contaminated soil before treatment. The amount of water needed for optimum agglomeration in the capillary region is dependent on particle size distribution and clay content of the feed; high clay soils are capable of holding more water than those with a coarser texture. Addition of amendments to control agglomerate porosity, and/or provide nutrients for subsequent bioremediation, can be added separately to or dissolved/dispersed in the water added for agglomeration. Water recovered from the SESR process during thermal treatment for agglomerate desolventizing, may contain steam distilled or dissolved organics which should be removed before recycle e.g., by carbon adsorption). Depending on the amount of water originally in the soil, and the amount added during processing, it may be necessary to discharge a small amount of water from the system.

The contaminant solution will sometimes contain dispersed solids which are preferentially oil wetted. Usually this situation only arises after prolonged contact between soil solids and contaminant; complete drying of the soil will also promote oil-solids contact and adhesion. If the separated oily contaminant has potential for recycling the solids level must be reduced to meet refinery specifications, which usually stipulate 0.5% (w/w) BSW (bottom solids and water). Centrifuges or settlers are suitable means for removal of these solids; the amount of solids present in the solvent/contaminant stream could range from 0–5% (w/w) of the original soil. Depending on the quantity, these solids may either be treated by incineration or remixed back with the agglomerate stream prior to the thermal desolventizing step.

In some petroleum spills the agglomerates, after solvent extraction, will still contain water soluble salts from the brine used in oil production. Before the soil is again suitable for agricultural purposes these salts must be removed by leaching, usually with water or dilute solutions of calcium or ammonium nitrates. The leaching process requires that the agglomerates be stable enough to withstand handling and repeated immersion in water. After these treatments the soil may be fertilized and inoculated with microorganisms, either directly, or by mixing with uncontaminated soil.

RESULTS AND DISCUSSION

Materials

A brine and crude oil contaminated soil from near Erskine, Alberta was used in preliminary trails. The soil was a black Chernozem; contamination was limited to the surface horizons After the contaminated soil had been thoroughly mixed with a Rototiller, a few kilograms were collected for use in these tests. A sample of uncontaminated, surface soil horizons from near the spill site was also collected; data from this sample is assumed to be similar to that of the contaminated soil but cannot be considered to be a control.

The non-contaminated soil was a silty, clay loam, containing 39 percent sand (50 to 2000 μm), 27 percent silt (2 to 50 μm) and 34 percent clay (less than 2 μm)[10]. The Unified Classification of the soil was a ML with a liquid limit of 41.2 percent and a plastic index of 15.7 percent. The natural organic matter content of the soil was 4.2 percent.

The soil had been contaminated with a mixture of brine and crude oil from a pipeline break that occurred between the well-site and the battery that processed the crude oil to remove brine. The contaminated soil had been stored in a large pile for several months prior to sampling. Analysis of the soil showed a hydrocarbon content of 5.6 percent. The presence of brine resulted in a pH of 7.7 and an electrical conductivity of 26.8 mS/cm[10]. The extreme water repellent condition of this soil was indicated by the fact that a 9.2N ethanol solution was needed to penetrate it in the dry state.

Method

A series of small scale, batch tests were carried out in the laboratory to determine the suitability of the SESA process for treating this soil. Before testing the soil sample was passed through a "Como Mill" (Quadro Engng., Breslau, Ontario) for delumping and removal of gravel (>2 mm), which might skew the analytical results for small samples. The soil also contained straw and grass stems which were more uniformly distributed after this treatment. Several solvents were compared and different combinations of washing and dispersion/agglomeration treatments were carried out. Five of these test conditions are summarised in Table 2; in each case the solvent to soil ratio was 1:1.

TABLE 2

BATCH TESTS FOR SESA TREATMENT OF SOIL CONTAMINATED WITH CRUDE OIL.

| Test | Solvent | Mixing | Washing | Additive |
|---|---|---|---|---|
| 1 | Varsol* | Shaking | None | 1% CaSO$_4$ |
| 2 | Toluene | Shaking | 2 × Rinses** | None |
| 3 | Heptane | Shaking | None | None |
| 4 | Varsol | Shaking | None | None |
| 5 | Varsol | Blend/shake | 2 × Rinses | None |

*Mid-range naphtha, Stoddard solvent, trademark
**Each rinse equal to 25% w/w of treated solids

Results

Figure 3:
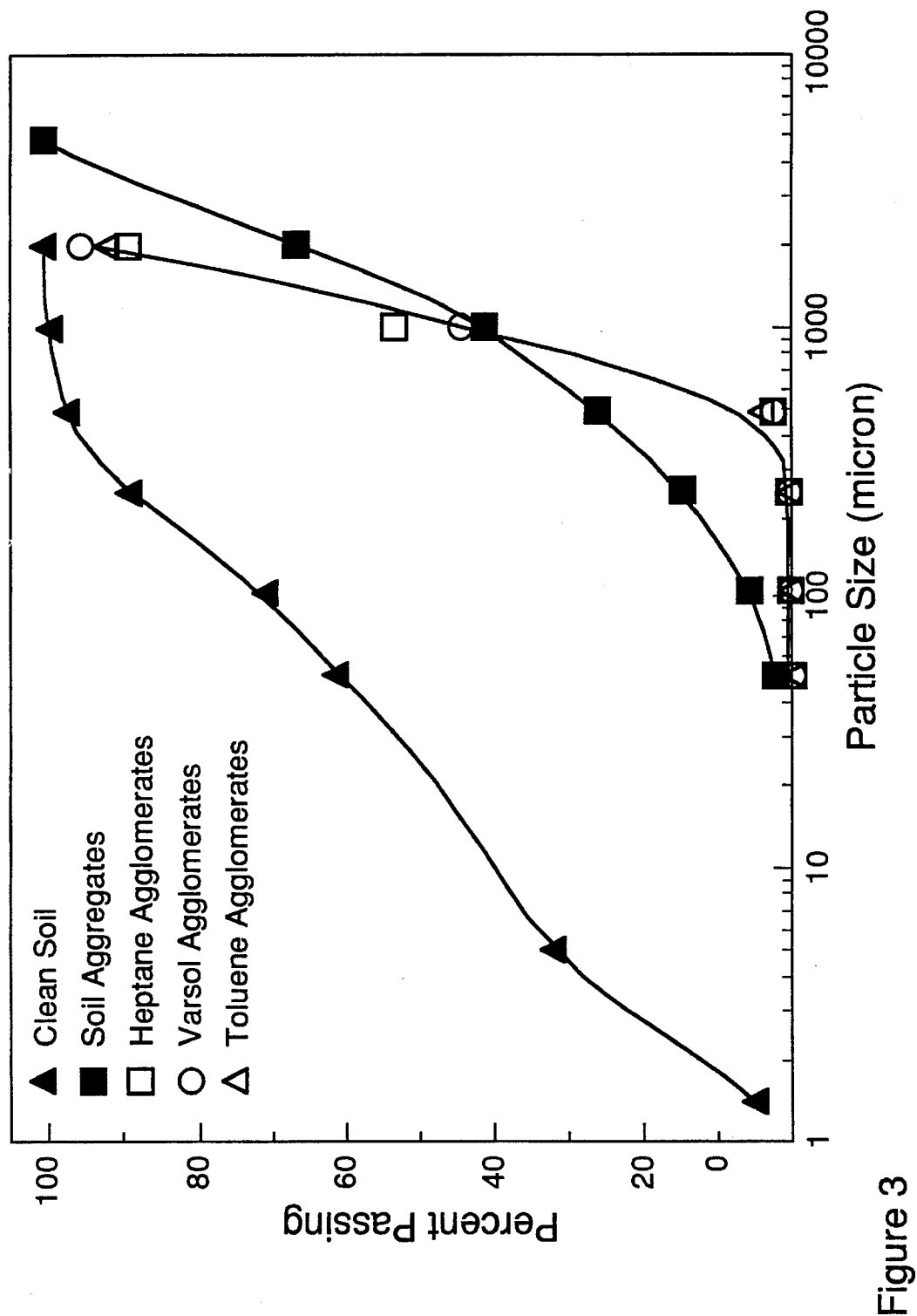
FIG. 3 is a graph illustrating the particle size distribution for SESR agglomerated and contaminated soils.

Natural aggregation forms fine textured soil into relatively stable clusters of particles that are physically discrete units[11]. This process increases soil porosity, particularly the macroporosity, which is characterised by the number of larger pores that are free draining. Solvent extraction destroys most of the natural aggregates in surface soil. However, the SESR process overcomes this problem by reaggregating the soil into roughly spherical agglomerates, concurrently with solvent extraction. The size of the agglomerates can be manipulated by process variable control to give a narrow size distribution, see FIG. 3.

There is some empirical evidence suggesting that primary soil aggregates in the 20 to 250 μm diameter range are not destroyed during treatment by the SESR process, unless the dispersive force used is severe. In Test 5, where a blender with high shear mixing capabilities, was used for primary extraction, the fine material was found to have a greater percentage of smaller aggregates. Destruction of these natural microaggregates may make the reconstituted soil less stable. However, preliminary results indicated that satisfactory treatment of the contaminated soil was not particularly dependent on the intensity of mixing, indicating that high intensities will not be required to achieve good solvent extraction.

Figure 4:
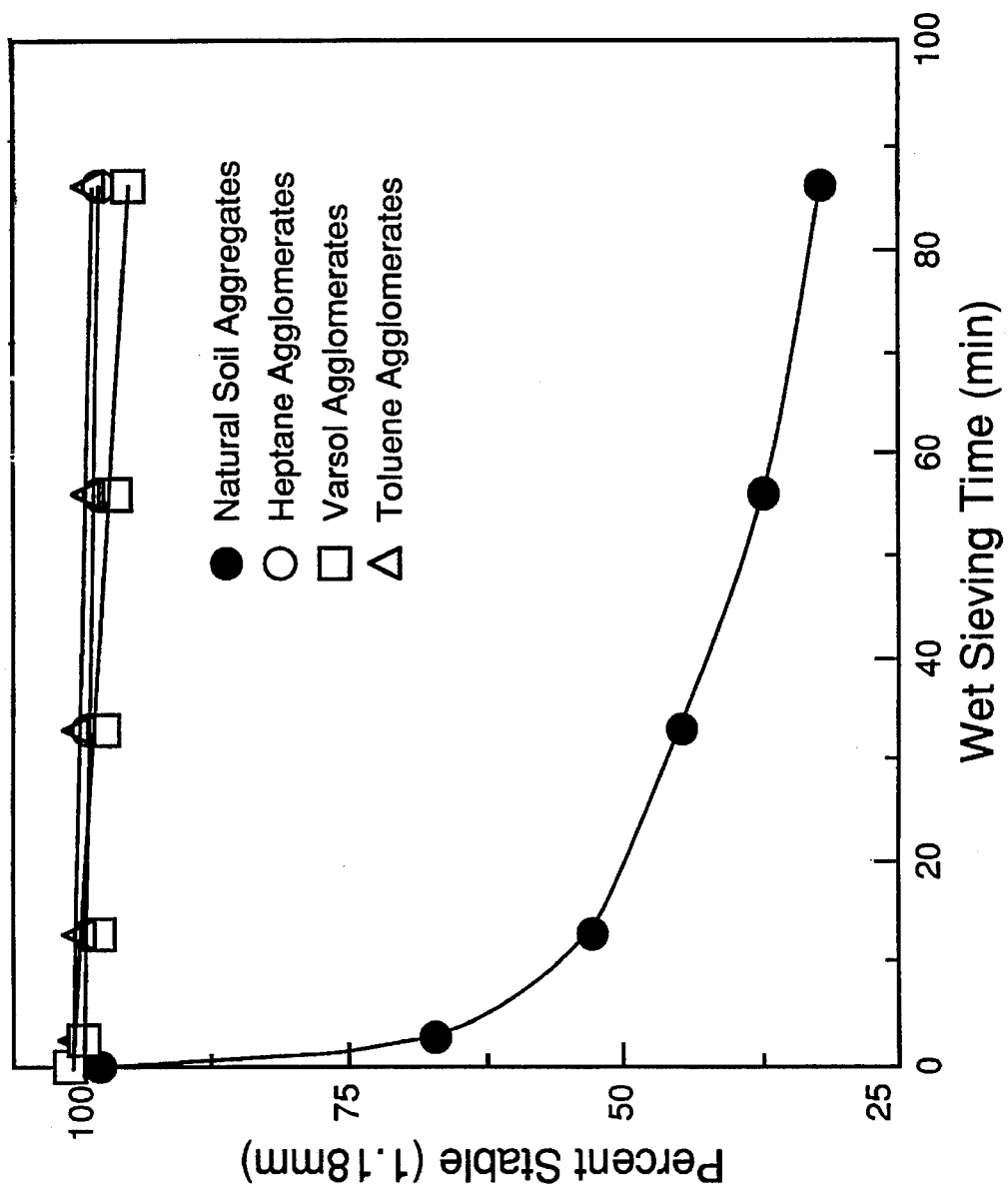
FIG. 4 is a graph illustrating agglomerate stability for SESR agglomerated and uncontaminated soils.

The soil agglomerates produced during processing were found to be three times more stable than similar sized aggregates separated from the uncontaminated soil sample. This difference is illustrated on FIG. 4; aggregate stability was measured by wet sieving in a standard apparatus [12]. The different extraction solvents used appeared to have had only a minor effect on agglomerate stability.

Figure 5:
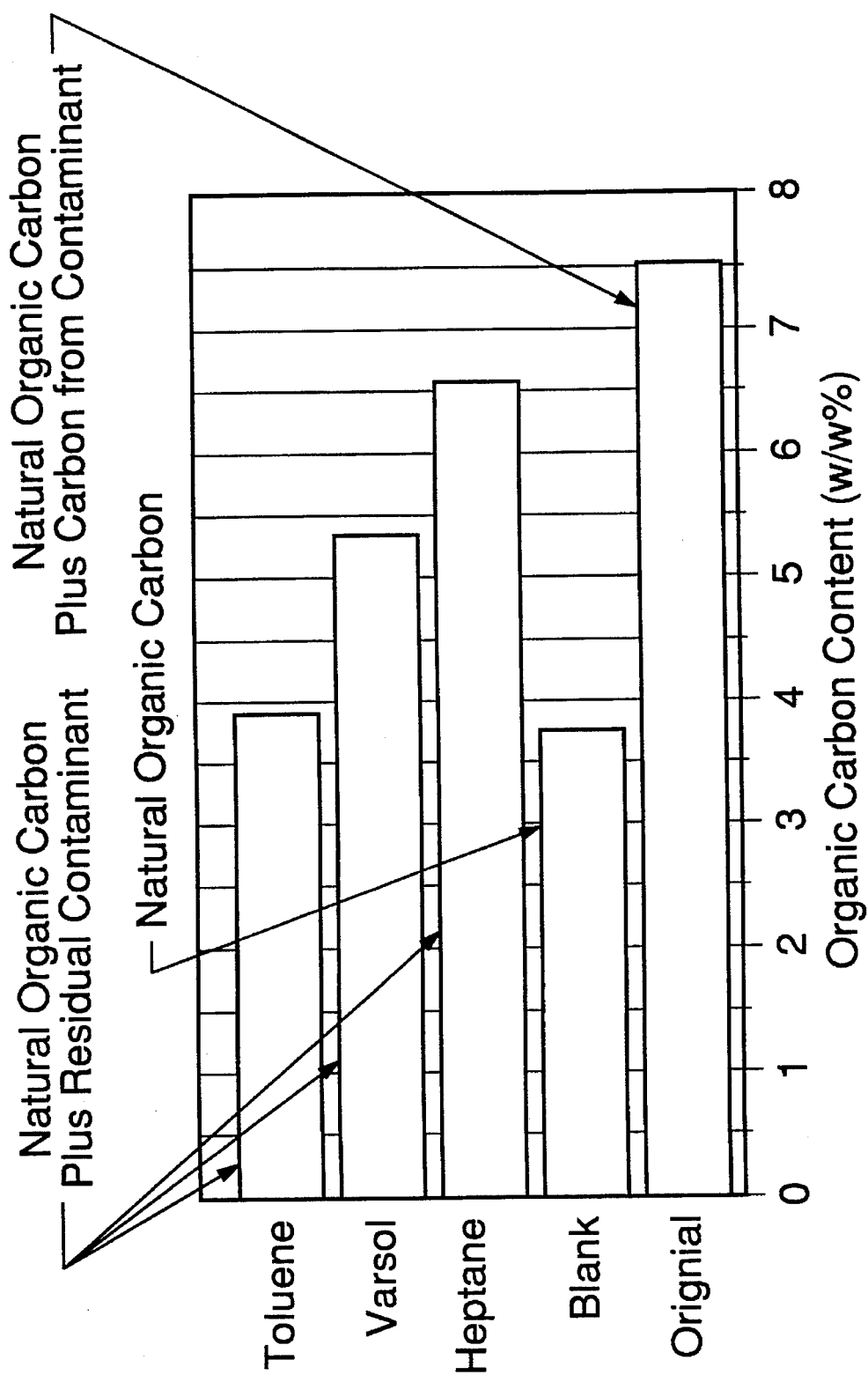
FIG. 5 is a bar graph illustrating the effect of solvent type on hydrocarbon contaminant extraction.

Agglomerates of cleaned soil were found to contain approximately 0.3% hydrocarbon, after drying at 105° C. to remove residual clean solvent after extraction, see FIG. 5; these results correspond to approximately 95% removal of the contaminating oil. The amount of contaminant residue remaining with the agglomerates was relatively independent of the solvent used for extraction. The SESR process had only a minor effect on soil carbon and the resident organic matter pool.

Figure 6A:
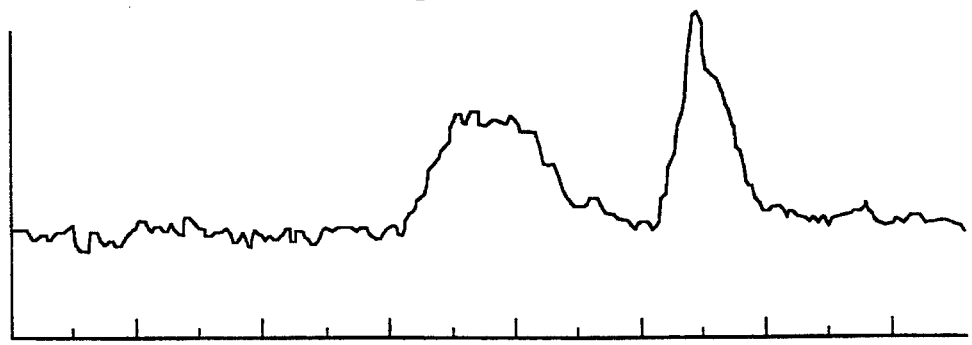
FIG. 6 (a) to (c) are NMR spectra illustrating the effect of the process according to the Invention on the humic content of soil.
Figure 6B:
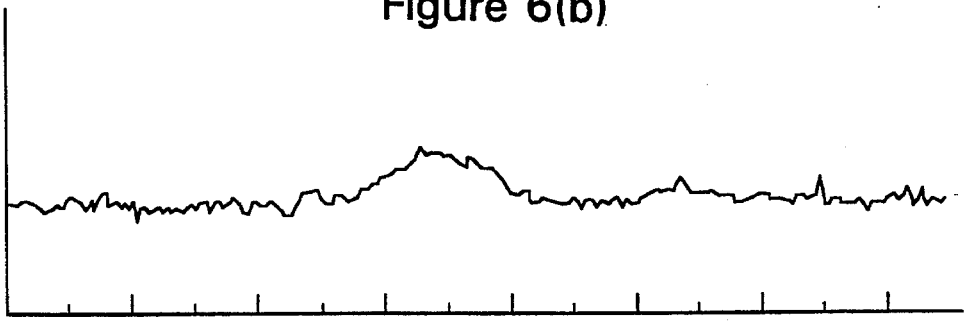
Figure 6C:
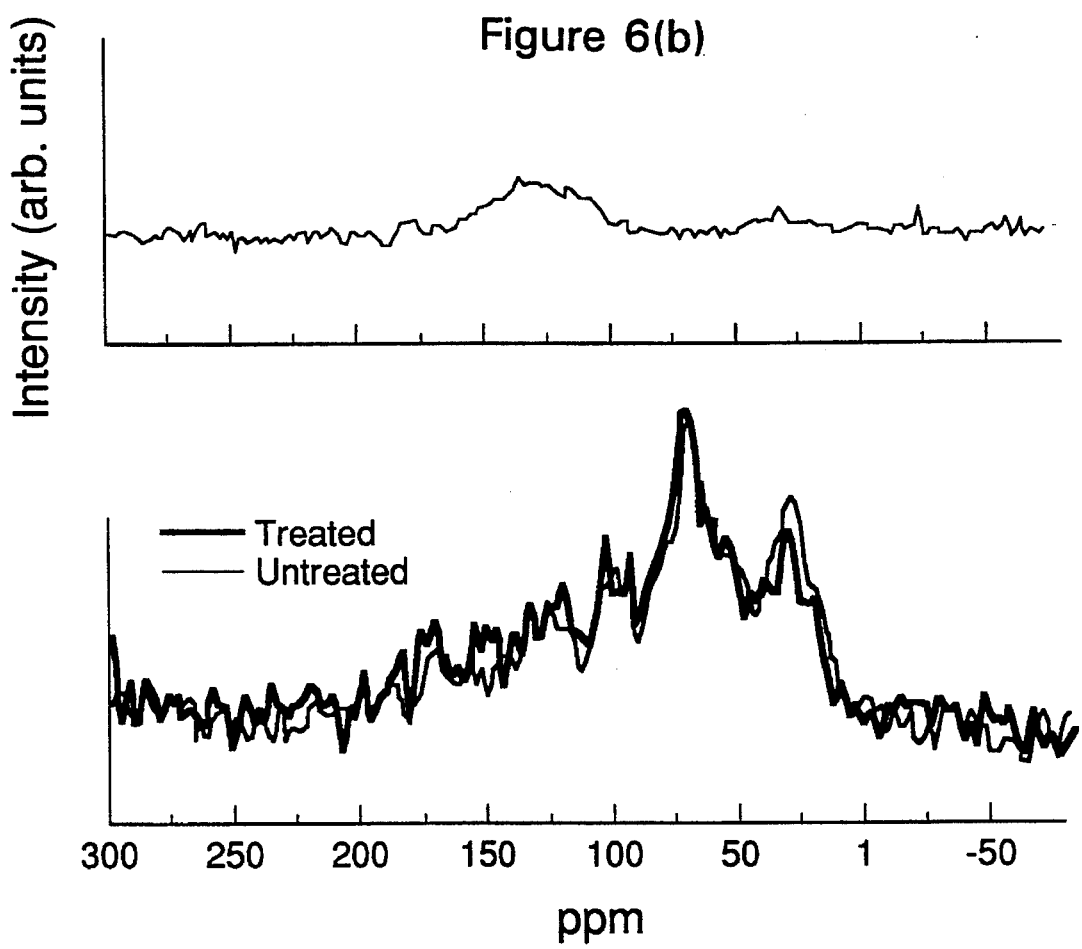

Solid state $^{13}C$ NMR was used to characterize the organic material in samples of treated, contaminated and uncontaminated soils. Cross polarization (CP/MAS) and Bloch decay techniques were used for solid organics(humics) and mobile, liquid organics(contaminants) respectively. NMR spectra for (a) untreated, and (b) treated soil, are shown in FIG. 6. The Bloch decay method gave two broad peaks corresponding to aromatic (75–150 ppm) and aliphatic (–25–25 ppm) species. This NMR signature is typical for Alberta bitumen and heavy oil. Remediated soil b) showed no evidence of residual aliphatic hydrocarbons. Although the aromatic content was obviously much reduced, the overlapping peak from the spinner effect prevented the quantitative evaluation of these components. The CP/MAS $^{13}C$ NMR spectra for treated and untreated soil are shown superimposed on FIG. 6(c). The spectra were remarkably similar to, and are typical of soil humic matter [13].

However, the retention of this organic pool, in a largely unchanged form, most likely contributes to the excellent stability of the agglomerates produced from the extracted soil. Maintenance of stable aggregates or agglomerates is crucial to maintaining soil quality and its ability to sustain crop production.

After agglomeration the soil remained saline, as indicated by an electrical conductivity of 29 mS/cm. Leaching of these brine contaminated agglomerates will be necessary before agronomic crops can be grown on the material. A soil electrical conductivity of less than 4 mS/cm is required for most crops [z]. Leaching of agglomerated soil will be rapid because the narrow size distribution of the aggregates resulted in a high permeability for beds of this material. The permeability should remain high during leaching as a result of the unusual stability of the artificial aggregates.

The tilth of SESR remediated soil was evaluated by growing field peas in treated soil in a growth chamber. This preliminary test of cleaned soil involved three different treatments: (1) extracted soil that had been leached to remove salts; (2) untreated contaminated soil; and (3) uncontaminated surface soil from a site adjacent the spill area. Specifically, salts were leached from the soil in treatment (1) because the soil had also been contaminated by brine. After six weeks, peas growing on extracted soil were nearly as large as those growing on uncontaminated soil, and germination in cleaned and uncontaminated soil was 100 percent. The cleaned soil was inoculated with 1% of uncontaminated soil to establish native flora and fauna. Although the growth chamber provided a nearly optimum growing environment, only one pea seed germinated in the contaminated soil, and its growth was poor.

An additional example, was run using trichloroethylene as solvent. Specifically, 600 g of Erskine soil contaminated with crude petroleum oil, along with 600 g of trichloroethylene and water up to 17% based on the weight of solids was added to a 4.5 liter rotating mill containing nine, 20 mm diameter soft iron rods. The charge was then rotated at 22.5 rpm for 8 minutes. Agglomerates of 0.5 to 2 mm diameter formed in the mill. The agglomerates and trichloroethylene (solvent) were separated by discharging the mill onto a 48 mesh screen. The agglomerates were then washed on the screen by spraying with 600 g of clean trichloroethylene and analyzed for residual contaminant. The results indicated that 99% of the contaminant had been removed.

It has been demonstrated that a fine textured soil, containing 34% clay, can be successfully solvent extracted to remove 95% of a heavy oil and leaving a contaminant reside of about 0.3%. The degree of oil extraction did not depend on the solvent used and the natural humic materials associated with the soil were not significantly affected by the treatment. Even though solvent extraction tended to break down the natural soil aggregates the SESR process restored the soil to an agglomerated state. The artificial aggregates formed in the process were found to be about three times more stable than natural, similar sized aggregates from an uncontaminated soil of the same type. As a result of this stability and the high permeability of the closely sized aggregates it is expected the leaching of the soil to remove any brine residues will not present a problem.

If solvent extraction alone is not sufficient to reduce the contaminant concentration to the regulated level then on-site, solid state bioremediation can be initiated. Efficient bioremediation requires an optimal physical environment, such as aeration, controlled moisture tension and access to appropriate nutrients. The aggregates formed in the SESR process can be engineered to meet these requirements by careful process control to regenerate a soil matrix having appropriate size distribution and porosity. Also, amendments, such as fertilizers and carbohydrates can be added to the process water to ensure their uniform distribution within the aggregate pores. In order to initiate bacterial growth the aggregates need only be inoculated with a small amount of native soil.

REFERENCES

1. Transportation Research Board, "Transportation of Hazardous Materials: Towards a National Strategy", Washington D.C., Vol 1, 1983.

2. E. J. Calabrese, P. T. Kostecki and E. J. Fleischer, "Soils Contaminated by Petroleum: Environmental and Public Health Effects", Eds. E. J. Calabrese and P. T. Kostecki, pp 1–2 John Wiley and Sons, New York, 1988.

3. M. A. Shirazi, L. Boersma and J. W. Hart, "A Unifying Quantitative Analysis of Soil Texture: Improvement of Precision and Extension of Scale", Soil Sci. Soc. Am. J. 52, 181–190 (1988).

4. P. R. W. Kendall, "Identification of Potential Environmental and Health Concerns of Soil Remediation Technologies", Environmental Protection Office, Department of Public Health, Toronto, November, 1991.

5. S. Gladstone, "Text Book of Physical Chemistry", 2nd Ed., MacMillan, London, pp. 734–735, 1960.

6. B. D. Sparks, F. W. Meadus, A. Kumar and J. R. Woods, "The Effect of Asphaltene Content of Solvent Selection for Bitumen Extraction by the SESA Process", Proceedings Eastern Oil Shale Symposium, Lexington, KY., November, 1991.

7. S. Goodwin and L. R. Turner, "The AOSTRA Taciuk Process—The Flexible Alternative for Oily Waste Treatment", Proceedings AOSTRA Oil Sands 2000 Symposium", Edmonton, Alberta, Paper #24, March 1990.

8. E. Bresler, B. L. McNeal and D. L. Carter, "Saline and Sodic Soils: Principles-Dynamics-Modeling", Springer-Verlag, New York, 1982.

9. D. Parkinson and E. A. Paul, "Microbial Biomass". In: "Methods of Soil Analysis, Part 2: Chemical and Microbial Properties", Ed. A. L. Page, Second Edition, Amer. Soc. Agronomy Inc., Madison, Wis., 1982.

10. I. Guo and D. H. McNabb, "Is Oil a Soil Lubricant?, 29th Alberta Soil Science Workshop", Lethbridge, Alberta (In Press).

11. W. D. Kemper and R. C. Rosenau, "Methods of Soil Analysis Part 1: Physical and Mineralogical Methods", Ed. A. Klute, Second Edition, Amer. Soc. Agronomy, Inc. Madison, Wis., 1982.

12. J. M. Tisdall and J. M. Oades, "Organic Matter and Water-Stable Aggregates in Soils", J. Soil Sci. 33, 141–163, (1982).

13. Wilson, M>A>, ED.; NMR Techniques and Applications in Geological Soil Chemistry, Pergamon Press, 1987.

We claim:

1. A method for removing contaminants from soil, comprising:

(a) contacting contaminated soil having 20% or more particles of less than 0.05 mm diameter with a solvent for the contaminant, in the presence of an aqueous bridging liquid immiscible with said solvent, while agitating to form soil agglomerates substantially free of contaminants and solvent, wherein the amount of bridging liquid is sufficient to fill the internal porosity of the soil agglomerates, and wherein the amount of bridging liquid and the degree of agitation are balanced to control the particle size of the soil agglomerates within a particle size range of 0.5 to 2 mm diameter and having substantially the same size distribution as natural soil aggregates, while maintaining the natural humic content of the soil and improving the aggregate strength and agglomerate stability; and (b) separating the substantially contaminant- and solvent-free soil agglomerates.

2. A method according to claim 1, further including reducing the amount of aqueous bridging liquid in the contaminated soil by means selected from the group consisting of pre-drying the soil, re-cycling dry cleaned soil and adding a material of lower moisture content selected from other soil, peat moss and fine agricultural limestone.

3. A method according to claim 1, wherein step (a) the feed soil, and the solvent and bridging liquid, are contacted either co-currently or counter-currently.

4. A method according to claim 1, including recovering the solvent, and re-cycling to step (a).

5. A method according to claim 1, wherein the temperature for step (a) is within a range of 25° to 50° C., and wherein the retention time is in the range of 2 to 10 minutes.

6. A method according to claim 1, for soils containing solvent-insoluble contaminants, the additional step of, (c) leaching the agglomerates to remove such contaminants.

7. A method according to claim 1, wherein water-soluble or water dispersible amendments to control agglomerate porosity, provide nutrients or both, are added to the soil during step (a).

8. A method according to claim 1, wherein the solvent is selected from the group consisting of naphtha, aromatic solvents of the class including toluene and xylene, halogenated solvents of the class including methylene chloride, trichlorotrifluoroethane and trichloroethylene, cyclic aliphatic compounds of the class including cyclohexane, straight chain aliphatic compounds of the class including heptane; and mixtures thereof.

9. A method according to claim 8, wherein the solvent is selected from a mid-range petroleum derived naphtha, toluene, heptane and trichloroethylene.

10. A method according to claim 9, wherein a small amount of methanol is included as a co-solvent.

11. A method according to claim 10, wherein the solvent is trichloroethylene.

12. A method according to claim 1, wherein the aqueous bridging liquid is water.

13. A method according to claim 1, wherein the aqueous bridging liquid includes a surface modifying agent selected from the group consisting of alkali metal pyrophosphates, orthophosphates and oxalates, alkali metal hydroxides, alkali metal silicates and petroleum sulphonates.

14. A method according to claim 1, wherein the soil agglomerates have a median particle size of about 1 mm diameter.

15. A method according to claim 1, including the additional step of, (c) adding microorganism inoculants to the soil aggregates.

16. A method according to claim 1, wherein the contaminated soil is a high fines content clay soil, containing about 34% clay and including a hydrocarbon contaminant.

17. A method according to claim 1, wherein the method is continuous.

18. A method according to claim 1, wherein the amount of aqueous bridging liquid included is in the range of 10–35% w/w.

19. A method according to claim 1, wherein the agitation is effected in a rotating mill containing mixing media in the form of rods of suitable size and weight.

* * * * *